(12) United States Patent
Peris et al.

(10) Patent No.: US 12,213,484 B2
(45) Date of Patent: Feb. 4, 2025

(54) HIGHLY LOADED FORMULATIONS WITH INSECTICIDES OF THE KETOENOL CLASS FOR USE IN DRIP AND DRENCH APPLICATIONS

(71) Applicant: BAYER AKTIENGESELLSCHAFT, Leverkusen (DE)

(72) Inventors: Gorka Peris, Cologne (DE); Pierre Philippe Haas, Leverkusen (DE); Stefan Herrmann, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 1095 days.

(21) Appl. No.: 17/046,743

(22) PCT Filed: Apr. 12, 2019

(86) PCT No.: PCT/EP2019/059479
§ 371 (c)(1),
(2) Date: Oct. 9, 2020

(87) PCT Pub. No.: WO2019/197637
PCT Pub. Date: Oct. 17, 2019

(65) Prior Publication Data
US 2021/0161140 A1  Jun. 3, 2021

(30) Foreign Application Priority Data
Apr. 13, 2018  (EP) ..................................... 18167285

(51) Int. Cl.
*A01N 43/90* (2006.01)
*A01N 25/04* (2006.01)
*A01N 43/80* (2006.01)

(52) U.S. Cl.
CPC ............. *A01N 43/90* (2013.01); *A01N 25/04* (2013.01); *A01N 43/80* (2013.01)

(58) Field of Classification Search
None
See application file for complete search history.

(56) References Cited

U.S. PATENT DOCUMENTS

| | | |
|---|---|---|
| 7,897,543 B2 | 3/2011 | Bretschneider |
| 7,968,107 B2 | 6/2011 | Baur |
| 7,977,278 B2 | 7/2011 | Vermeer |
| 8,247,351 B2 | 8/2012 | Fischer |
| 8,664,259 B2 | 3/2014 | Fischer |
| 2010/0010051 A1* | 1/2010 | Vermeer ................ A01N 51/00 514/342 |
| 2010/0099717 A1 | 4/2010 | Vermeer |
| 2011/0003875 A1 | 1/2011 | Vermeer |
| 2011/0086762 A1 | 4/2011 | Fischer |
| 2011/0190493 A1 | 8/2011 | Bretschneider |
| 2011/0294783 A1 | 12/2011 | Fischer |
| 2017/0166546 A1 | 6/2017 | Bristow |

FOREIGN PATENT DOCUMENTS

| | | |
|---|---|---|
| AU | 2017202401 B2 | 3/2018 |
| CA | 2718735 A1 | 9/2009 |
| CN | 101522031 A | 9/2009 |
| EP | 1905302 A1 | 4/2008 |
| EP | 2092822 A1 | 8/2009 |
| JP | 2010505753 A | 2/2010 |
| JP | 2011514330 A | 5/2011 |
| JP | 2011515352 A | 5/2011 |
| WO | 2005084435 A2 | 9/2005 |
| WO | 2005084441 A2 | 9/2005 |
| WO | 2006089633 A2 | 8/2006 |
| WO | 2007068428 A2 | 6/2007 |
| WO | 2008037375 A2 | 4/2008 |
| WO | 2008037379 A1 | 4/2008 |
| WO | 2009007014 A1 | 1/2009 |
| WO | 2009102736 A1 | 8/2009 |
| WO | 2009115262 A1 | 9/2009 |

OTHER PUBLICATIONS

International Search Report Application No. PCT/EP2019/059479 mailed May 17, 2019.

* cited by examiner

*Primary Examiner* — Dominic Lazaro
(74) *Attorney, Agent, or Firm* — Gale Wesley Starkey

(57) ABSTRACT

The present invention relates to solvent-free aqueous suspension concentrates having high active ingredient concentration, good biological efficacy and good rheological stability, and to processes for production thereof. The formulations of the invention are suitable for the field of plant protection.

12 Claims, No Drawings

HIGHLY LOADED FORMULATIONS WITH INSECTICIDES OF THE KETOENOL CLASS FOR USE IN DRIP AND DRENCH APPLICATIONS

CROSS-REFERENCE TO RELATED APPLICATIONS

This application is the National Stage entry of International Application No. PCT/EP2019/059479, filed 12 Apr. 2019, which claims priority to European Patent Application No. 18167285.8, filed 13 Apr. 2018.

BACKGROUND

Field

The present invention relates to solvent-free aqueous suspension concentrates having high active ingredient concentration, good biological efficacy and good rheological stability, and to processes for production thereof. The formulations of the invention are suitable for the field of plant protection.

Description of Related Art

Active ingredients can in principle be formulated in many different ways, and the properties of the active ingredients and the nature of the formulation can present problems in terms of producibility, stability, usability and efficacy of the formulations. Moreover, particular formulations are more advantageous than others for economic and environmental reasons.

Water-based formulations generally have the advantage of requiring a small proportion of organic solvents, if any, and dispensing with organic solvents can offer environmental benefits.

On the other hand, there is generally a need for highly concentrated formulations of active ingredients because the higher concentration has many advantages. For example, with highly concentrated formulations, there is less need for packaging than with formulations of low concentration. There is a corresponding reduction in the expenditure on production, transport (volume and frequency) and storage. Furthermore, there is simplification, for example, of the preparation of the spray liquors used in agriculture through the smaller amounts of crop protection compositions, for example, which have to be handled, for example in the dispensing and mixing operation. Moreover, water-concentrated formulations are usually not just more highly concentrated than organic, solvent-containing formulations, but also environmentally desirable since they are free of solvents. Furthermore, highly concentrated formulations offer more economic handling of inert or carrier materials of the formulations.

At the same time, the elevated loading with AI (active ingredient) must not lead to a decrease in the technical stability of the formulation.

Highly concentrated suspension concentrates (SCs) are therefore preferable from an economic and environmental point of view.

However, some substances, for instance herbicide safeners, cannot be added directly to water because of their low and broad melting range and their amorphous structure, and so they first have to be dissolved/formulated in organic solvents. In that case, they are formulated, for example, as organic dispersions, aqueous emulsion, suspoemulsion, capsule suspension or as emulsion concentrate, with the low-melting active ingredient in dissolved or emulsified form. A disadvantage here is that it is not possible through the addition of organic solvents to obtain aqueous dispersion; instead, what are formed are aqueous emulsions or suspoemulsions, which are much less stable in storage and usually also of lower concentration than pure aqueous dispersions. In the processing of the technical concentrate to give water-dispersible granules, up to 20% by weight remains in the end product in the case of the mineral oils customarily used as solvent (for example Solvesso® 200 ND from ExxonMobil).

Furthermore, the use of agrochemical formulations may be advantageous for soil application in cases where it is advantageous to avoid exposure of plant parts above the ground to crop protection products or else simply to avoid drift of the AI and exposure of unintended areas and of fauna and flora that live there. The reasons for this may lie in inadequate plant compatibility of the formulation or else in incompatibility with other agrochemical products.

Soil application by drip or drench is advantageous especially in the case of systemically active AIs since their effect is also displayed in parts of the plant far removed from the root that absorbs the AI.

WO 2006/089633 A2 discloses liquid formulations of particular ketoenol insecticides that are based on organic solvents and can be employed in hydrocultures to counter leaf-eating and/or leaf-sucking insects. However, the dimethylformamide solvent described in WO 2006/089633 is classified as being of toxicological concern and is a potential reproductive toxin or teratogen.

Furthermore, WO 2009/115262 A1 discloses water-based dispersions of ketoenol insecticides for control of leaf-dwelling insects. The formulations described have a maximum loading of 50 g/L (5%), although a higher loading would be desirable from an economic point of view. However, the formulations known from WO 20097115262 A1 are unsuitable for higher loadings.

WO 2007/068428 A2 describes the enhancing of the effect of crop protection compositions comprising fatty acid biosynthesis inhibitors (for example phenyl-substituted cyclic ketoenols) through the addition of ammonium salts and/or phosphonium salts or through the addition of ammonia or phosphonium salts and penetrants, the corresponding compositions, processes for production thereof and the use thereof in crop protection.

A disadvantage of the formulations known from the prior art (whether in the form of suspension concentrate or water-dispersible granules) is that high amounts of organic solvents, which are undesirable in environmental terms and for the user, have to be used for dissolution of the safener, while the loading with AI and also the biological action are inadequate.

There is thus still a need for new formulations in the form of aqueous dispersions (SC) that have high active ingredient loading coupled with good environmental compatibility (zero or minimum organic solvent) and good biological action, and also good bioavailability of the active ingredients in the soil, or on soil application.

SUMMARY

It was thus an object of the present invention to provide an aqueous dispersion, preferably essentially free of organic solvents, of particular ketoenol insecticides that have high active ingredient loading, good environmental compatibility and good biological action.

The present invention thus provides aqueous active ingredient dispersions (SC) having the abovementioned properties, and a process for producing aqueous, solvent-free formulations (dispersions), and the use thereof as insecticide.

It has also been found that, surprisingly, the biological activity of the aqueous dispersions of the invention can be improved with rising pH.

The invention therefore provides insecticidal compositions in the form of highly concentrated aqueous suspension concentrates comprising:
a. at least one ketoenol insecticide
b. at least one dispersant, preferably selected from the group of the nonionic dispersants and salts thereof,
c. at least one pH buffer,
d. at least one rheology modifier,
e. at least one antifreeze,
f. at least one biocide,
g. at least one defoamer, and
h. optionally further active ingredients and adjuvants, and
i. water.

DETAILED DESCRIPTION OF A PREFERRED EMBODIMENT

In the present invention, in formulae, e.g. formula (I), optionally substituted radicals, unless stated otherwise, may be mono- or polysubstituted, where the substituents in the case of polysubstitutions may be the same or different.

Moreover, in the ranges of preference stated above in the present invention, the different levels of preference should be understood such that they can be combined with one another in permutations, but in any case identical levels of preference and especially the most preferred embodiment/level of preference in each case are to be combined with one another and are indeed disclosed as such a combination.

Compositions as described above that consist solely of the essential components (not optional components) should likewise be considered to be disclosed.

Percentages—unless stated otherwise—should be regarded as percentages by weight, where the % by weight of the compositions add up to 100.

Unless defined differently, "basic" in the context of the present invention means a pH in aqueous solution with pH>7.

a) Active Ingredient

In a preferred embodiment, component a) in the compositions of the invention is a ketoenol based on tetramic acids, preferably compounds of the formula (I)
in which
W and Y are independently hydrogen, $C_1$-$C_4$-alkyl, chlorine, bromine, iodine or fluorine,
X is $C_1$-$C_4$-alkyl, $C_1$-$C_4$-alkoxy, chlorine, bromine or iodine,
A, B and the carbon atom to which they are bonded are $C_3$-$C_6$-cycloalkyl substituted by an optionally $C_1$-$C_4$-alkyl- or $C_1$-$C_4$-alkoxy-$C_1$-$C_2$-alkyl-substituted alkylenedioxy group that forms a 5-membered or 6-membered ketal together with the carbon atom to which it is bonded,
G is hydrogen (a) or is one of the groups

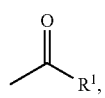
(b)

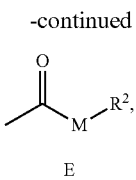

in which
E is a metal ion or an ammonium ion,
M is oxygen or sulfur,
$R^1$ is straight-chain or branched $C_1$-$C_6$-alkyl,
$R^2$ is straight-chain or branched $C_1$-$C_6$-alkyl.

Usable with particular preference are tetramic acid derivatives of the abovementioned formula (I) in which the radicals are defined as follows:
W is more preferably methyl,
X is more preferably chlorine or methyl (more preferably methyl),
Y is more preferably chlorine, bromine or methyl,
A, B and the carbon atom to which they are bonded are more preferably saturated $C_6$-cycloalkyl substituted by an alkylenedioxy group that forms a 5-membered or 6-membered ketal together with the carbon atom to which it is bonded,
G is more preferably hydrogen (a) or is one of the groups

(b)

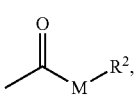
(c)

(d)

in which
M is oxygen,
E is one metal ion equivalent or an ammonium ion (specifically sodium or potassium),
$R^1$ is more preferably straight-chain or branched $C_1$-$C_4$-alkyl,
$R^2$ is more preferably straight-chain or branched $C_1$-$C_4$-alkyl.

Specifically usable are tetramic acid derivatives of the abovementioned formula (I) with G=hydrogen (a).

Likewise most preferably usable are tetramic acid derivatives of the formula (I) mentioned above where G=E (d).

Especially preferably usable are tetramic acid derivatives of the abovementioned formula (I) in which the radicals are defined as follows:

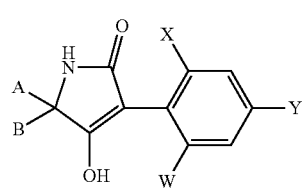
(I)

| Ex. no. | W | X | Y | A | B | known from WO 06/089633), Ex. no. |
|---------|-----|-----|-----|---|---|---|
| I-1 | CH₃ | CH₃ | CH₃ | —(CH₂)₂—C—(CH₂)₂—, O—(CH₂)₂—O | | I-1-a-2 |
| I-2 | CH₃ | CH₃ | Cl | —(CH₂)₂—C—(CH₂)₂—, O—(CH₂)₂—O | | I-1-a-4 |
| I-3 | CH₃ | CH₃ | Br | —(CH₂)₂—C—(CH₂)₂—, O—(CH₂)₂—O | | I-1-a-26 |
| I-4 | CH₃ | CH₃ | CH₃ | —(CH₂)₂—C—(CH₂)₂—, O—(CH₂)₃—O | | I-1-a-18 |
| I-5 | CH₃ | CH₃ | Cl | —(CH₂)₂—C—(CH₂)₂—, O—(CH₂)₃—O | | I-1-a-14 |
| I-6 | CH₃ | CH₃ | Br | —(CH₂)₂—C—(CH₂)₂—, O—(CH₂)₃—O | | I-1-a-19 |

In a particularly preferred embodiment, component a) is a compound of the formula

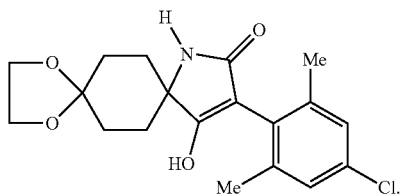

(I-2)

Compound I-2 is preferably used in the form of its most thermodynamically stable polymorphous structure. This crystal structure and further physical data were determined as follows:

Sample Preparation:

Compound I-2 ($C_{19}H_{22}ClNO_4$/MW=363.84 g/mol) was crystallized from methanol and dried at room temperature, giving modification A.

Modification A of I-2 can be characterized by x-ray powder diffractometry based on the corresponding diffraction diagrams that were recorded at 25° C. and with Cu-Kα 1 radiation (1.5406 Å)(FIG. 1).

Modification A according to the present invention shows at least 3, preferably at least 5, further preferably at least 7, even further preferably at least 10 and most preferably all reflections as shown in table 2a:

Modification A according to the present invention is further characterized by the x-ray diffraction diagram shown in FIG. 1.

Crystallographic studies on single crystals of modification A showed that the crystal structure is monoclinic. The unit cell has the $P2_1/c$ space group.

TABLE 1

Crystallographic properties of modification A

| Parameter | Polymorph A |
|---|---|
| Crystal system | monoclinic |
| Space group | $P2_1/c$ |
| a in Å | 11.66544 ± 14 |
| b in Å | 9.50603 ± 10 |
| | 16.66907 ± 19 |
| | 90 |
| | 110.2045 ± 13 |
| | 90 |
| Z | 4 |
| Density (calculated) | | a, b, c = length of the sides of the unit cell
α, β, γ = angles of the unit cell
Z = number of molecules in the unit cell TABLES 2a/b Crystallographic data/reflections [°2theta] of polymorph A

| 2a Reflections [°2theta] Polymorph A | 2b Reflections [°2theta] Polymorph A |
|---|---|
| 11.3 | 8.0 |
| 14.6 | 10.8 |
| 16.0 | 11.3 |
| 20.1 | 12.2 |
| 21.7 | 14.6 |
| 22.7 | 16.0 |
| 23.1 | 17.6 |
| 24.5 | 18.4 |
| 28.2 | 19.4 |
| 29.0 | 20.1 |
| | 21.7 |
| | 22.7 |
| | 23.1 |
| | 23.8 |
| | 24.5 |
| | 25.9 |
| | 26.4 |
| | 28.2 |
| | 29.0 |
| | 29.4 |
| | 30.1 |
| | 30.6 |
| | 32.2 |
| | 36.2 |
| | 37.4 |
| | 38.2 |
| | 39.1 |

The polymorphic form of modification A of I-1 can be determined by IR spectroscopy from the corresponding spectrum which has been recorded at 25° C. using a diamond ATR instrument at a resolution of 4 cm⁻¹ (FIG. 2). Polymorph A of the present invention shows at least 3, preferably at least 5, further preferably at least 7 and especially preferably all bands as can be seen in FIG. 2 and are described in table 2c.

TABLE 2c

IR bands [cm⁻¹]

| Band maxima [cm⁻¹] Polymorph A | Band maxima [cm⁻¹] |
|---|---|
| 3378 | 1133 |
| 2969 | 1109 |
| 2955 | 1088 |
| 2943 | 1045 |

TABLE 2c-continued

| Band maxima [cm⁻¹] Polymorph A | Band maxima [cm⁻¹] |
|---|---|
| 2924 | 1036 |
| 2876 | 1027 |
| 2858 | 1015 |
| 2326 | 997 |
| 1637 | 980 |
| 1592 | 965 |
| 1575 | 946 |
| 1564 | 936 |
| 1470 | 903 |
| 1444 | 869 |
| 1438 | 856 |
| 1428 | 821 |
| 1394 | 783 |
| 1372 | 769 |
| 1344 | 748 |
| 1325 | 704 |
| 1317 | 691 |
| 1297 | 659 |
| 1272 | 639 |
| 1247 | 625 |
| 1194 | 573 |
| 1157 | 563 |
|  | 553 |

In an alternative embodiment, component a) comprises tetramic acids of the formula (II)

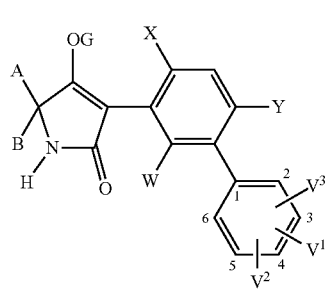

(II)

in which

W and Y are independently hydrogen, $C_1$-$C_4$-alkyl, chlorine, bromine, iodine or fluorine, X is $C_1$-$C_4$-alkyl, $C_1$-$C_4$-alkoxy, chlorine, bromine or iodine, $V^1$ is hydrogen, halogen, $C_1$-$C_6$-alkyl, $C_1$-$C_5$-alkoxy, $C_1$-$C_6$alkylthio, $C_1$-$C_6$ alkylsulfinyl, $C_1$-$C_6$ alkylsulfonyl, $C_1$-$C_4$ haloalkyl, $C_1$-$C_4$-haloalkoxy, nitro or cyano, $V^2$ is hydrogen, halogen, $C_1$-$C_6$-alkyl or $C_1$-$C_6$-alkoxy, $V^3$ is hydrogen or halogen, A, B and the carbon atom to which they are bonded are saturated $C_5$-$C_6$-cycloalkyl in which one ring member has been replaced by oxygen and which is optionally monosubstituted by $C_1$-$C_8$-alkyl, $C_1$-$C_8$-alkoxy or $C_1$-$C_6$-alkyloxy-$C_1$-$C_6$-alkyl, G is hydrogen (a) or is one of the groups

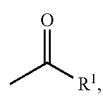

(b)

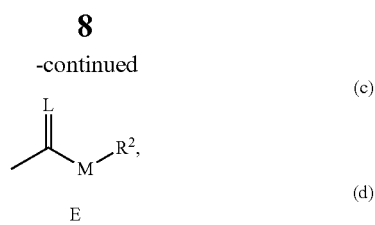

in which

E is a metal ion or an ammonium ion,

L is oxygen or sulfur and

M is oxygen or sulfur, $R^1$ is straight-chain or branched $C_1$-$C_6$-alkyl, $R^2$ is straight-chain or branched $C_1$-$C_6$-alkyl.

Usable with particular preference are tetramic acid derivatives of the abovementioned formula (I) in which the radicals are defined as follows:

W is more preferably hydrogen or methyl,

X is more preferably chlorine or methyl,

Y is more preferably hydrogen, $V^1$ is more preferably fluorine or chlorine (specifically fluorine or chlorine in the 4 position), $V^2$ is more preferably hydrogen or fluorine (specifically fluorine in the 3 position), $V^3$ is more preferably hydrogen or fluorine (specifically fluorine in the 5 position), A, B and the carbon atom to which they are bonded are more preferably saturated C-cycloalkyl in which one ring member has been replaced by oxygen, G is more preferably hydrogen (a) or is one of the groups

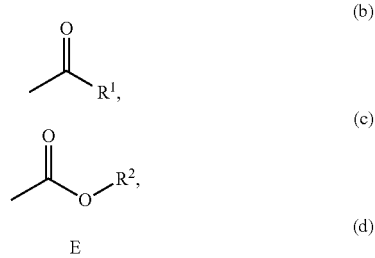

in which

E is more preferably one metal ion equivalent or an ammonium ion (specifically sodium or potassium), $R^1$ is more preferably straight-chain or branched $C_1$-$C_4$-alkyl, $R^2$ is more preferably straight-chain or branched $C_1$-$C_4$-alkyl.

Specifically usable are tetramic acid derivatives of the abovementioned formula (I) with G=hydrogen (a).

Likewise most preferably usable are tetramic acid derivatives of the formula (I) mentioned above where G=E (d).

Especially preferably usable are tetramic acid derivatives of the abovementioned formula (II) in which the radicals are defined as follows:

| Ex. no. | W | X | Y | | known from WO 08/067,911 |
|---|---|---|---|---|---|
| II-1 | —(CH$_2$)$_2$O (CH$_2$)$_2$— | Cl | 4-F | | I-1-a-13 |
| II-2 | —(CH$_2$)$_2$O (CH$_2$)$_2$— | Cl | 4-F | 3-F | I-1-a-21 |

-continued

| Ex. no. | W | X | Y | | | | known from WO 08/067,911 |
|---|---|---|---|---|---|---|---|
| II-3 | —(CH$_2$)$_2$O(CH$_2$)$_2$— | Cl | 4-F | 3-F | 5-F | | I-1-a-30 |
| II-4 | —(CH$_2$)$_2$O(CH$_2$)$_2$— | CH$_3$ | H | 4-F | H | H H | I-1-a-1 |
| II-5 | —(CH$_2$)$_2$O(CH$_2$)$_2$— | CH$_3$ | 4-F | 3-F | | | I-1-a-3 |
| II-6 | —(CH$_2$)$_2$O(CH$_2$)$_2$— | CH$_3$ | 4-F | 3-F | 5-F | | I-1-a-28 |
| II-7 | —(CH$_2$)$_2$O(CH$_2$)$_2$— | CH$_3$ | CH$_3$ | 4-F | | | I-1-a-4 |
| II-8 | —(CH$_2$)$_2$O(CH$_2$)$_2$— | CH$_3$ | CH$_3$ | 4-F | 3-F | | I-1-a-5 |
| II-9 | —(CH$_2$)$_2$O(CH$_2$)$_2$— | CH$_3$ | CH$_3$ | 4-F | 3-F | 5-F | I-1-a-25 |

In a particularly preferred alternative embodiment, a) is

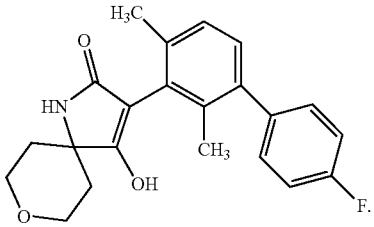

(II-7)

b) Dispersants

Suitable anionic dispersants b1), such as emulsifiers, surfactants, wetting agents and dispersers, are, for example, alkali metal, alkaline earth metal or ammonium salts of sulfonates, sulfates, phosphates, carboxylates and mixtures thereof, for example the salts of alkylsulfonic acids or alkylphosphoric acids and alkylarylsulfonic or alkylarylphosphoric acids, diphenylsulfonates, alpha-olefinsulfonates, lignosulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols or of fatty acid esters. Examples of phosphates are phosphate esters. Examples of carboxylates are alkyl carboxylates and carboxylated alcohol ethoxylates or alkylphenol ethoxylates. Likewise suitable is the group of anionic emulsifiers of the alkali metal, alkaline earth metal and ammonium salts of the polystyrenesulfonic acids, salts of the polyvinylsulfonic acids, salts of the alkylnaphthalenesulfonic acids, salts of alkylnaphthalenesulfonic acid-formaldehyde condensation products, salts of condensation products of naphthalenesulfonic acid, phenolsulfonic acid and formaldehyde. Examples are calcium dodecylbenzenesulfonate such as Rhodocal® 70/B (Solvay), Phenylsulfonat CA100 (Clariant) or isopropylammonium dodecylbenzenesulfonates such as Atlox® 3300B (Croda).

Further typical representatives include Phenylsulfonat CA (calcium dodecylbenzenesulfonate), Soprophor® products (optionally esterified derivatives of tristyrylphenol ethoxylates), Emulsogene® 3510 (alkylated EO/PO copolymer), Emulsogen® EL 400 (ethoxylated castor oil), Tweeno products (fatty acylated sorbitan ethoxylates), Calsogen® AR 100 (calcium dodecylbenzenesulfonate). Preference is given to combinations of salts of alkylated aromatic sulfonic acids, such as calcium phenylsulfonate and/or Calsogen® AR 100, with alkylated copolymers of ethylene oxide and propylene oxide, such as Emulsogen® 3510. Particular preference is given to combinations of salts of dodecylbenzenesulfonic acid, such as Calsogen® AR 100, with alkylated copolymer of ethylene oxide and propylene oxide, such as Emulsogene® 3510.

Examples of further anionic dispersants b1) from the group of the naphthalenesulfonates are Galoryl® MT 800 (sodium dibutylnaphthalenesulfonate), Morwet® IP (sodium diisopropylnaphthalenesulfonate) and Nekal® BX (alkylnaphthalenesulfonate). Examples of anionic surfactants from the group of the condensates of naphthalenesulfonates with formaldehyde are Galoryl® DT 201 (naphthalenesulfonic acid hydroxy polymer with formaldehyde and methylphenol sodium salt), Galoryl® DT 250 (condensate of phenol- and naphthalenesulfonates), Reserve® C (condensate of phenol- and naphthalenesulfonates) or Morwet® D-425, Tersperse® 2020. Preference is given to 1,2-dibutyl- or-diisobutyl-substituted naphthalenesulfonates, for example products such as Galoryla® MT 800 (CFPI-Nufarm) and Nekal® BX (BASF). Further typical surfactants are Soprophor® 3D33, Soprophor® 4D384, Soprophor® BSU, Soprophor® CY/8 (Solvay) and Hoe® S3474, and in the form of the Sapogenat® T products (Clariant), for example Sapogenat® T 100.

Useful nonionic dispersants b2), such as emulsifiers, wetting agents, surfactants and dispersers, include standard surface-active substances present in formulations of agrochemical active compounds. Examples include ethoxylated nonylphenols, reaction products of linear or branched alcohols with ethylene oxide and/or propylene oxide, ethylene oxide-propylene oxide block copolymers, end group-capped and non-end group-capped alkoxylated linear and branched, saturated and unsaturated alcohols (e.g. butoxy polyethylenepropylene glycols), reaction products of alkylphenols with ethylene oxide and/or propylene oxide, ethylene oxide-propylene oxide block copolymers, polyethylene glycols and polypropylene glycols, and also fatty acid esters, fatty acid polyglycol ether esters, alkylsulfonates, alkylsulfates, arylsulfates, ethoxylated arylalkylphenols, for example tristyrylphenol ethoxylate having an average of 16 ethylene oxide units per molecule, and also ethoxylated and propoxylated arylalkylphenols, and also sulfated or phosphated arylalkylphenol ethoxylates or ethoxy- and propoxylates. Particular preference is given to tristyrylphenol alkoxylates and fatty acid polyglycol ether esters. Very particular preference is given to tristyrylphenol ethoxylates, tristyrylphenol ethoxy propoxylates and castor oil polyglycol ether esters, in each case individually or in mixtures. Additives may additionally be useful, such as surfactants or esters of fatty acids, which contribute to improvement in biological efficacy. Suitable nonionic emulsifiers b2) are, for example, Soprophor® 796/P, Lucramul® CO30, Lucramul® HOT, Lucramul® PSI 100, Lucramul PS 29 or Synperonic® T304.

Suitable nonionic dispersers b2) may likewise be selected from the group comprising polyvinylpyrrolidone (PVP), polyvinyl alcohol, copolymer of PVP and dimethylaminoethyl methacrylate, butylated PVP, copolymer of vinyl chloride and vinyl acetate, and partially hydrolyzed vinyl acetate, phenol resins, modified cellulose types, for example Luviskol® (polyvinylpyrrolidone), Mowiol® (polyvinyl alcohol) or modified cellulose. Preference is given to polyvinylpyrrolidone types, particular preference to types of low molecular weight such as Luviskol® K30 or Sokalan® K30.

Useful further nonionic emulsifiers b2) from the group of the di- and triblock copolymers of alkylene oxides are, for example, compounds based on ethylene oxide and propylene oxide, having mean molar masses between 200 and 10 000 and preferably 1000 to 4000 g/mol, where the proportion by mass of the polyethoxylated block varies between 10 and 80%, for example the Synperonic® PE series (Uniqema), the Pluronic® PE series (BASF), the VOP® 32 or Genapol® PF series (Clariant).

Particular preference is given to using nonionic dispersants, more preferably nonionic dispersants based on tristyrylphenol polyethylene glycol ethers, e.g. Lucramul PS 29, and polyethylene-modified poly(methyl methacrylate) methacrylic acids, e.g. Atlox® 4913.

c) pH Buffers

Useful pH buffers include the standard commercial pH buffers, for example citrate, phosphate and acetate. Preference is given to using pH buffers having a pH<=7 (measured in aqueous solution with a hydrogen electrode).

Preference is given to using citrate- and phosphate-based pH buffers.

d) Rheology Modifiers

Useful rheology modifiers c) include organic thickeners and inorganic thickeners. Useful organic thickeners include organic natural or biotechnologically modified or organic synthetic thickeners. Typical synthetic thickeners are Rheostrux® (Croda) or the Thixin® or Thixatrol® series (Elementis). These are typically based on acrylates. Typical organic thickeners are based on xanthan or cellulose (for instance hydroxyethyl or carboxymethyl cellulose) or a combination thereof, or are from the class of the anionic polysaccharides containing four sugar molecules (glucose, glucuronic acid, glucose, rhamnose) as repeat base unit in the main chain. Further typical representatives are based on cellulose or lignin. Preference is given to using natural modified thickeners based on xanthan. Typical representatives are, for example, Rhodopol® (Solvay) and Kelzan® (Kelco Corp.), and also Satiaxane® (Cargill). Preference is likewise given to silicas and attapulgites.

Particular preference is given to using xanthan as rheology modifier.

e) Antifreezes

Suitable antifreezes are those from the group of the ureas, diols and polyols, such as ethylene glycol and propylene glycol, glycerol, preferably propylene glycol or glycerol, more preferably glycerol.

f) Biocides

Biocides used are preferably biocides based on isothiazolinones, preferably selected from the group consisting of benzisothiazolinone, chloromethylisothiazolinone, methylisothiazolinone, and mixtures thereof.

Particular preference is given to biocides based on 1,2-benzisothiazolin-3-one and chloromethylisothiazolinone.

Suitable biocides are, for example, products such as Acticide® MBS (Biozid, Thor Chemie), CIT, MIT or BIT, for instance Proxel® GXL (BIT), Acticide® SPX (MIT, CIT), Kathon CGI.

g) Defoamers

Suitable defoamers are surface-active silicone- or silane-based compounds such as the Tegopren® products (Goldschmidt), the SE® products (Wacker), and the Bevaloid® (Kemira), Rhodorsil® (Solvay) and Silcolapse® products (Blustar Silicones), preference being given to SE® (Wacker), Rhodorsil® and Silcolapse® products, particular preference, for example, to silicone-based defoamers, e.g. products such as Silcolapse® 5020.

h) Optionally Further Active Ingredients and Adjuvants

The compositions of the invention optionally contain further formulation auxiliaries (h), for example optionally substances from the groups of the antioxidants, the dyes and/or the inert filler materials, penetrants, and further, preferably insecticidal, active ingredients.

Useful antioxidants are all substances typically usable for this purpose in agrochemical compositions. Preference is given to butylhydroxytoluene.

Useful dyes are all substances typically usable for this purpose in agrochemical compositions. Examples include titanium dioxide, pigment black, zinc oxide and blue pigments, and also Permanent Red FGR.

Useful penetrants in the present context are, for example, polyalkoxytriglycerides. Polyalkoxytriglycerides can be prepared by alkoxylating triglycerides. The alkoxylation of triglycerides leads to substance mixtures wherein 1 to 3 of the side chains are alkoxylated. Alkoxylation can be divided into ethoxylation, propoxylation, butoxylation, or a mixture of these operations. The length of each of the unmodified side chains may vary, independently of the other side chains in the same molecule, between 9 and 24, preferably between 12 and 22 and very preferably between 14 and 20 carbon atoms. These aliphatic side chains may be straight or branched.

Further active insecticidal ingredients (f) are preferably selected from the group consisting of imidacloprid, nitenpyram, acetamiprid, thiacloprid, thiamethoxam, clothianidin, cyantraniliprole, chlorantraniliprole, flubendiamid, tetraniliprole, cyclaniliprole; spirodiclofen, spiromesifen, spirotetramat, abamectin, acrinathrin, chlorfenapyr, emamectin, ethiprole, fipronil, flonicamid, flupyradifuron, indoxacarb, metaflumizone, methoxyfenozid, milbemycin, pyridaben, pyridalyl, silafluofen, spinosad, sulfoxaflor, triflumuron; more preferably from the group consisting of ethiprole and flupyradifuron.

The proportion of the active ingredient (component a/compounds of the formula I/I-2/or alternatively II/II-7) in the compositions of the invention is preferably 75-600 g/L, further preferably 100-500 g/L, even further preferably 150-450 g/L, and especially preferably 200-450 g/L.

The proportion of dispersant (component b) in the compositions of the invention is preferably 10-150 g/L, further preferably 30-100 g/L and especially preferably 40-90 g/L.

The proportion of pH buffer (component c) in the compositions of the invention is preferably 0.5-10 g/L, further preferably 0.7-5 g/L and especially preferably 0.9-2 g/L.

The proportion of rheology modifier (component d) in the compositions of the invention is preferably 1-10 g/L, further preferably 2-8 g/L and especially preferably 3-5 g/L.

The proportion of antifreeze (component e) in the compositions is preferably 0-200 g/L, further preferably 50-200 g/L and especially preferably 100-150 g/L.

The proportion of biocide (component f) in the compositions is
preferably 0-2 g/L,
further preferably 0.01-2 g/L and
especially preferably 0.05-1.5 g/L.

The proportion of defoamer (component g) in the compositions is
preferably 0-2 g/L,
further preferably 0.01-2 g/L and
especially preferably 0.05-1.5 g/L.

The proportion of the further active ingredients and adjuvants (component f)—if present—in the compositions of the invention is
preferably 0-10 g/L,
further preferably 0-8 g/L and
especially preferably 0.01-5 g/L.

Water is added to the formulations of the invention as described above and also further down to make them up to 1 L in each case.

The pH in the aqueous compositions of the invention is preferably 3-9, further preferably 4-8 and especially preferably 5 to 7.

A preferred embodiment of the invention is compositions comprising components
a) 75-600 g/L
b) 10-150 g/L,
c) 0.5-10 g/L,
d) 1-10 g/L.

A further-preferred embodiment of the invention is compositions comprising components
a) 100-500 g/L
b) 30-100 g/L,
c) 0.7-5 g/L,
d) 2-8 g/L.

An even further-preferred embodiment of the invention is compositions comprising components
a) 150-400 g/L
b) 40-90 g/L,
c) 0.9-2.0 g/L,
d) 3-5 g/L.

A preferred alternative embodiment of the invention is compositions comprising components
a) 150-400 g/L
b) 40-90 g/L,
c) 0.9-2.0 g/L,
d) 3-5 g/L,
e) 100-150 g/L,
f) 0.05-1.5 g/L,
g) 0.05-1.5 g/L.

An even further-preferred embodiment of the invention is compositions comprising components
a) 200-400 g/L
b) 40-90 g/L,
c) 0.9-2.0 g/L,
d) 3-5 g/L.

A preferred alternative embodiment of the invention is compositions comprising components
a) 200-400 g/L
b) 40-90 g/L,
c) 0.9-2.0 g/L,
d) 3-5 g/L,
e) 100-150 g/L,
f) 0.05-1.5 g/L,
g) 0.05-1.5 g/L.

In the abovementioned embodiments and in all compositions of the invention specified in the present application, the pH of the aqueous suspension concentrates is preferably 3-9, further preferably 4-8 and especially preferably from 5 to 7.

In a preferred embodiment, the invention provides an insecticidal composition comprising:
a. Compounds of the Formula (I)

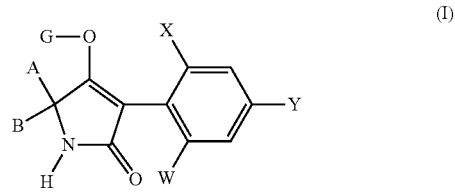

where the compounds of the formula (I) have the following definitions:
W is methyl,
X is chlorine or methyl,
Y is chlorine, bromine or methyl,
A, B and the carbon atom to which they are attached represent saturated C6-cycloalkyl which is substituted by an alkylenedioxy group which, together with the carbon atom to which it is attached, forms a 5-membered or 6-membered ketal,
G is hydrogen (a) or is one of the groups

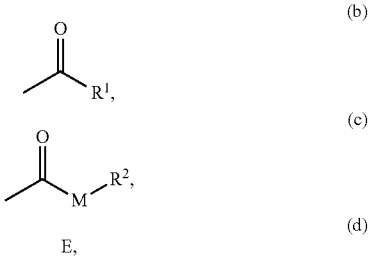

in which
M is oxygen,
E is one metal ion equivalent or an ammonium ion,
$R^1$ is straight-chain or branched $C_1$-$C_4$-alkyl,
$R^2$ is straight-chain or branched $C_1$-$C_6$-alkyl.
b. at least one nonionic dispersant selected from the group consisting of tristyrylphenol alkoxylates and fatty acid polyglycol ether esters,
c. at least one pH buffer selected from the group consisting of citrate- and phosphate-based pH buffers,
d. at least one rheology modifier selected from the group consisting of organic thickeners based on xanthan or cellulose or a combination thereof,
e. optionally at least one antifreeze selected from the group consisting of ureas, diols and polyols,
f. optionally at least one biocide from the group of isothiazolinones,
g. optionally at least one defoamer from the group of the silicone- or silane-based defoamers,
h. optionally further active ingredients and adjuvants.

In a further-preferred embodiment, the invention provides an insecticidal composition comprising:
a. compound of the formula (I) selected from the following compounds:

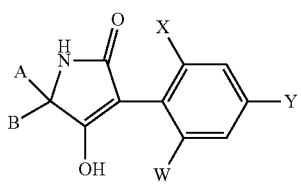

(I)

| W | X | Y | A | B |
|---|---|---|---|---|
| CH$_3$ | CH$_3$ | CH$_3$ | —(CH$_2$)$_2$—C—(CH$_2$)$_2$— / O—(CH$_2$)$_2$—O | |
| CH$_3$ | CH$_3$ | Cl | —(CH$_2$)$_2$—C—(CH$_2$)$_2$— / O—(CH$_2$)$_2$—O | |
| CH$_3$ | CH$_3$ | Br | —(CH$_2$)$_2$—C—(CH$_2$)$_2$— / O—(CH$_2$)$_2$—O | |
| CH$_3$ | CH$_3$ | CH$_3$ | —(CH$_2$)$_2$—C—(CH$_2$)$_2$— / O—(CH$_2$)$_3$—O | |
| CH$_3$ | CH$_3$ | Cl | —(CH$_2$)$_2$—C—(CH$_2$)$_2$— / O—(CH$_2$)$_3$—O | |
| CH$_3$ | CH$_3$ | Br | —(CH$_2$)$_2$—C—(CH$_2$)$_2$— / O—(CH$_2$)$_3$—O | | b. at least one nonionic dispersant selected from the group of the tristyrylphenol alkoxylates, c. at least one pH buffer selected from the group consisting of citrate- and phosphate-based pH buffers, d. at least one rheology modifier selected from the group consisting of organic thickeners based on xanthan, e. optionally at least one antifreeze selected from the group consisting of diols and polyols, f. optionally at least one biocide from the group consisting of benzisothiazolinone, chloromethylisothiazolinone and methylisothiazolinone, g. optionally at least one defoamer from the group of the silicone-based defoamers, h. optionally further active ingredients and adjuvants.

In a particularly preferred embodiment, the invention provides an insecticidal composition comprising:

a. compound having the formula (I-2) having the following structure:

(I-2)

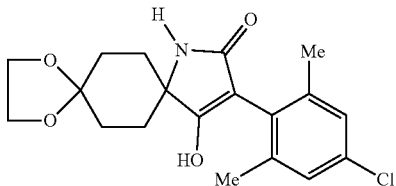

(I)

b. at least one nonionic dispersant selected from the group comprising tristyrylphenol alkoxylates, c. at least one pH buffer selected from the group consisting of citrate- and phosphate-based pH buffers, d. at least one rheology modifier selected from the group consisting of xanthan, e. optionally at least one antifreeze selected from the group consisting of ethylene glycol, propylene glycol and glycerol, preferably propylene glycol and glycerol, and more preferably glycerol, f. optionally at least one biocide from the group consisting of benzisothiazolinone, g. optionally at least one defoamer from the group of the silicone-based defoamers, h. optionally further active ingredients and adjuvants.

The application rate of the formulations of the invention can be varied within a relatively wide range. It is guided by the respective active ingredients and by the content thereof in the compositions.

With the aid of the compositions of the invention, the insecticidal active ingredient mixtures can be deployed in a particularly advantageous manner on plants and/or their habitat.

The compositions of the invention can be used to treat all plants and parts of plants. Plants in this context are understood to include all plants and plant populations, such as desired and unwanted wild plants or crop plants (including naturally occurring crop plants). Crop plants may be plants which can be obtained by conventional breeding and optimization methods or by biotechnological and genetic engineering methods or combinations of these methods, including the transgenic plants and including the plant cultivars which are protectable or non-protectable by plant breeders' rights. Parts of plants shall be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Plant parts also include harvested material and vegetative and generative propagation material, for example cuttings, tubers, rhizomes, shoots and seeds.

Preferably, the compounds of the formula (I or II) are, following drench, dip or drip application, used against animal pests from the following pest families:

Preference is given from the family of the woolly aphids (Pemphigidae) to: *Eriosoma* spp., *Pemphigus* spp., in crops such as, for example, citrus fruit, pomaceous fruit, stone fruit, leaf vegetables, root and tuber vegetables and ornamental plants.

Preference is given from the family of the grape lice (Phylloxeridae) to: Phylloxera spp. in grapevines, nuts, citrus fruit.

Preference is given from the family of the jumping plant lice (Psyllidae) to: Psylla spp., *Paratrioza* spp., Tenalaphara spp., Diaphorina spp., Trioza spp., in crops such as, for example, pomaceous fruit, stone fruit, citrus fruit, vegetables, potatoes, in tropical crops.

Preference is given from the family of the soft scales (Coccidae) to: *Ceroplastes* spp., *Drosicha* spp., *Pulvinaria* spp., *Protopulminaria* spp., *Saissetia* spp., *Coccus* spp., in perennial crops such as, for example, citrus fruit, pomaceous fruit, stone fruit, olives, grapevines, coffee, tea, tropical crops, ornamental plants, vegetables.

Preference is given from the family of the armoured scale insects (Diaspididae) to: Quadraspidiotus spp., *Aonidiella* spp., *Lepidosaphes* spp., *Aspidiotus* app., *Aspis* spp., *Diaspis* spp., *Parlatoria* spp., *Pseudaulacaspis* spp., *Unaspis* spp., *Pinnaspis* spp., *Selenaspidus* spp., in crops such as, for example, citrus fruit, pomaceous fruit, stone fruit, almonds, pistachios, nuts, olives, tea, ornamental plants, grapevines, tropical crops.

Preference is given from the family of the ensign scales (Ortheziidae) to: *Orthezia* spp. in citrus fruit, pomaceous fruit, stone fruit.

Preference is given from the family of the mealy bugs (Pseudococcidae) to: Pericerga, Pseudococcus spp., *Planococcus* spp., *Dysmicoccus* spp., in crops such as, for example, citrus fruit, stone fruit and pomaceous fruit, tea, grapevines, vegetables, ornamental plants and tropical crops.

Preference is furthermore given from the family of the whiteflies (Aleyrodidae) to: Bemisia tabaci, Bemisia argentifolii, Trialeurodes vaporariorum, *Aleurothrixus floccosus*, *Aleurodes* spp., *Dialeurodes* spp., *Parabemisia myricae* in crops such as, for example, vegetables, melons, potatoes, tobacco, soft fruit, citrus fruit, ornamental plants, cotton, soya beans and tropical crops.

Moreover, preference is given from the family of the aphids (Aphidae) to:

*Myzus* spp. in tobacco, stone fruit, soft fruit, fruit vegetables, leafy vegetables, tuber and root vegetables, melons, potatoes, ornamental plants, spices,

*Acyrthosiphon onobrychis* in vegetables,

*Aphis* spp. in tobacco, citrus fruit, pomaceous fruit, stone fruit, melons, strawberries, soft fruit, fruit vegetables, leafy vegetables, tuber, stem and root vegetables, ornamental plants, potatoes, pumpkins, spices,

*Rhodobium porosum* in strawberries,

*Nasonovia ribisnigri* in leafy vegetables,

*Macrosiphum* spp. in ornamental plants, potatoes, leafy vegetables and fruit vegetables, strawberries,

*Phorodon humuli* in hops,

*Brevicoryne brassicae* in leafy vegetables,

*Toxoptera* spp. in citrus fruit, stone fruit, almonds, nuts, spices,

*Aulacorthum* spp. in citrus fruit, potatoes, fruit vegetables and leafy vegetables,

*Anuraphis cardui* in vegetables,

*Brachycaudus* helycrsii in sunflowers,

*Acyrthosiphon onobrychis* in vegetables.

Likewise, preference is given from the family of the *thrips* (Thripidae) to: *Anaphothrips* spp., *Baliothrips* spp., *Caliothrips* spp., *Frankliniella* spp., *Heliothrips* spp., *Hercinothrips* spp., *Rhipiphorothrips* spp., *Scirtothrips* spp., *Kakothrips* spp., *Selenothrips* spp. and *Thrips* spp., in crops such as, for example, fruit, cotton, grapevines, tea, nuts, tropical crops, ornamental plants, conifers, tobacco, spices, vegetables, soft fruit, melons, citrus fruit and potatoes.

Moreover, preference is given from the families of the leaf-miner flies (Agromyzidae) and root-maggot flies (Anthomyiidae) to: Agromyza spp., *Amauromyza* spp., *Atherigona* spp., *Chlorops* spp., *Liriomyza* spp., *Oscinella* spp., *Pegomyia* spp. in crops such as, for example, vegetables, melons, potatoes, nuts, ornamental plants.

Preference is given from the families of the leafhoppers (Cicadellidae) and planthoppers (Delphacidae) to: *circulifer* spp., Dalbus spp., *Empoasca* spp., *Erythroneura* spp., *Homalodisca* spp., lodioscopus spp., *Laodelphax* spp., *Nephotettix* spp., *Nilaparvata* spp., *Oncometopia* spp., *Sogatella* spp., in crops such as, for example, citrus fruit, fruit, grapevines, potatoes, vegetables, ornamental plants, conifers, melons, soft fruit, tea, nuts, rice and tropical crops.

Preference is given from the family of the leaf-miner moths (Gracillariidae) to:

*Caloptilia* spp., *Gracillaria* spp., *Lithocolletis* spp., *Leucoptera* spp., Phtorimaea spp., *Phyllocnistis* spp. in crops such as pomaceous fruit, stone fruit, grapevines, nuts, citrus fruit, conifers, potatoes, coffee.

Preference is given from the family of the gall midges (Cecidomyiidae) to:

*Contarinia* spp., *Dasineura* spp., *Diplosis* spp., *Prodiplosis* spp., *Thecodiplosis* spp., *Sitodiplosis* spp., *Haplodiplosis* spp. in crops such as citrus fruit, pomaceous fruit, stone fruit, vegetables, potatoes, spices, soft fruit, conifers, hops.

Likewise, preference is given from the family of the fruit flies (Tephritidae) to:

*Anastrepha* spp., *Ceratitis* spp., Dacus spp., *Rhagoletis* spp. in crops such as vegetables, soft fruit, melons, pomaceous and stone fruit, ornamental plants, potatoes, grapevines, tropical crops, citrus fruit, olives.

Moreover, preference is given to mites from the families of the spider mites (Tetranychidae) and the gall mites (Eriophydae):

*Tetranychus* spp., *Panonychus* spp., Aculops spp. in crops such as vegetables, potatoes, ornamental plants, citrus fruit, grapevines, conifers.

The inventive treatment of the plants and parts of plants with the compositions of the invention is effected directly or by allowing the compositions to act on their surroundings, environment or storage space by the customary treatment methods, for example by drenching, immersion, spraying, evaporation, fogging, scattering, painting on and, in the case of propagation material, in particular in the case of seeds, also by applying one or more coats.

The active ingredient is preferably applied by watering onto the soil. Alternatively, the active ingredient is applied by drip or dip application.

Preferably, the plant to be treated is selected from the group consisting of cotton, soya beans, tobacco, vegetables, spices, ornamental plants, conifers, citrus plants, fruit, tropical crops, nuts and grapevines.

Preferably, the composition of the invention acts against pests from the families of the woolly aphids, grape lice, jumping plant lice, soft scales, armoured scale insects, ensign scales, mealy bugs, whiteflies, aphids, thrips, leafhoppers, planthoppers, leaf-miner flies, gall midges, fruit flies, leaf-miner moths, spider mites, gall mites.

The suspension concentrates of the invention are produced by mixing the components with one another in the particular ratios desired. The sequence in which the constituents are combined with one another may be as desired. It is appropriate to use the solid components in the finely ground state. However, it is also possible to subject the suspension formed after the combination of the constituents first to a coarse and then to a fine grinding step, such that the mean particle size is below 20 sm. Preference is given to suspension concentrates in which the solid particles have an average particle size between 1 and 10 µm (determination by laser diffraction, for example with Malvern Mastersizer 2000 or 3000, by diluting the sample in pH 4 buffer until the dispersion attains a suitable turbidity). The data are processed using Fraunhofer diffraction, or Mie theory.)

In the course of performance of the process of the invention, the temperatures can be varied within a particular range. In general, working temperatures are between 10° C. and 60° C., preferably between 15° C. and 40° C.

Useful equipment for performance of the process of the invention is customary mixing and grinding equipment which is used to prepare agrochemical formulations.

In the process of the invention, the water preferably has a temperature between 0° C. and 40° C., preferably between 5° C. and 20° C.

In a further preferred embodiment (II) of the process of the invention, in a

The present invention likewise provides water-dispersible suspension concentrates (SCs) obtainable by the process of the invention.

The grinding can be effected by the methods known in the prior art, for example by wet grinding of the components in ball mills (for example discontinuous ball mills, or continuous ball mills), or colloid mills (for example toothed colloid mills).

With the SCs of the invention, a better biological efficacy and bioavailability on soil application can be achieved at the same application rate. Advantageously, the SCs of the invention exhibit excellent plant compatibility, such as a reduced tendency to cause phytotoxic damage.

The SCs according to the invention surprisingly exhibit excellent dispersing and stabilizing properties after further dilution with liquids, preferably water, coupled with improved biological activity.

In addition, the SCs give rise to formulations with improved rheological properties which have prolonged storage stability and impeccable applicability.

The invention is illustrated in detail by the examples, without being limited thereby.

EXAMPLES

Feedstocks Used:

The terms used in the examples below have the following meanings:

| | |
|---|---|
| citric acid | polybasic organic acid |
| Rhodopol ® 23 | xanthan derivative (Solvay) |
| Silfoam ® SRE | silicone defoamer (Wacker) |
| SAG 1572 | silicone defoamer (Momentive) |
| glycerol | antifreeze |
| Proxel ® GXL | preservative (biocide, Proxel) |
| Kathon CG/ICP | preservative (biocide, Rohm and Haas) |
| Lucramul PS29 | tristyrylphenol ethoxylate (dispersant, Levaco) |
| Lucramul PS54 | tristyrylphenol ethoxylate (dispersant, Levaco) |
| Atlox 4913 | ethoxylate polymethacrylate graft (dispersant, Croda) |

Preparation Examples

To prepare a suspension concentrate, all liquid components are first mixed with one another. In the next step, the solids are added and stirred until a homogeneous suspension is obtained. The homogeneous suspension is subjected first to a coarse and then to a fine grinding operation, so as to obtain a suspension in which 90% of the solid particles have a particle size below 5 µm. Subsequently added while stirring at room temperature are the preliminary thickener solution, antifreeze and water. A homogeneous suspension concentrate is obtained.

The examples which follow illustrate the invention without limiting it in any way. All figures are in g/L.

TABLE 3

Comparative examples

| | Dispersant | | Rheology modifier | pH buffer | Antifreeze | | Biocide | Defoamer | | Water | |
|---|---|---|---|---|---|---|---|---|---|---|---|
| 1-1 | 1-2 | 25 | 40 | 1.2 | 1 | Glycerol 100 | 0.8/1.2 | | 1 | Water | ad 1000 mL |
| 1-2 | 1-2 | 49 | 15/45 | 1.2 | 1 | Glycerol 100 | 0.8/1.2 | | 1 | Water | ad 1000 mL |
| 1-3 | 1-2 | 100 | 40 | 1.2 | 1 | Glycerol 100 | 0.8/1.2 | | 1 | Water | ad 1000 mL |
| 1-4 | 1-2 | 100 | 15/45 | 1.2 | 1 | Glycerol 100 | 0.8/1.2 | | 1 | Water | R ad 1000 mL est |
| 1-5 | 1-2 | 200 | 15/45 | 1.2 | 1 | Glycerol 100 | 0.8/1.2 | | 1 | Water | ad 1000 mL |
| 1-6 | 1-2 | 300 | 15/45 | 1.2 | 1 | Glycerol 100 | 0.8/1.2 | | 1 | Water | ad 1000 mL |
| 1-7 | 1-2 | 400 | 15/45 | 1.2 | 1 | Glycerol 100 | 0.8/1.2 | | 1 | Water | ad 1000 mL |

TABLE 4

Inventive examples

| | Dispersant | | Rheology modifier | pH buffer | Antifreeze | | Biocide | Defoamer | Water | |
|---|---|---|---|---|---|---|---|---|---|---|
| 2-1 | I-2 | 100 | 42 | 4 | 1 | Glycerol 106 | | 0.8/1.2 | 1 Water | ad 1000 mL |
| 2-2 | I-2 | 100 | 16/48 | 4 | 1 | Glycerol 106 | Kathon CGI/Proxel GXL | 0.8/1.2 | 1 Water | ad 1000 mL |

TABLE 4-continued

Inventive examples

| | Dispersant | Rheology modifier | pH buffer | Antifreeze | Biocide | | Defoamer | | Water |
|---|---|---|---|---|---|---|---|---|---|
| 2-3 | I-2 200 | 16/49 | 4 | 1 | Glycerol 109 | | 0.8/1.2 | 1 | Water ad 1000 mL |
| 2-4 | I-2 300 | 17/51 | 4 | 1 | Glycerol 112 | | 0.8/1.2 | 1 | Water ad 1000 mL |
| 2-5 | I-2 400 | 17/51 | 5 | 1 | Glycerol 114 | | 0.8/1.2 | 1 | Water ad 1000 mL |
| 2-6 | I-2 100 | 42 | 4.24 | 7.4 5.9 | Glycerol 106 | | 0.85/1.27 | 1 | Water ad 1000 mL |
| 2-7 | I-2 100 | 42 | 4.2 | 7.4 30.7 | Glycerol 106 | | 0.85/1.27 | 1 | Glycerol ad 1000 mL |
| 2-8 | I-2 225 | 16.4/47.7 | 4.4 | 0 | Glycerol 109 | — | 0.87/1.31 | SAG1572 1 | Water ad 1000 mL |

TABLE 5

Rheological properties

| (Comparative) example | | | Dynamic Viscosity @ Yield Stress (Pa*s) |
|---|---|---|---|
| 1-1 (comparative) | | 50° | 0.1 | 0.5 |
| 1-2 (comparative) | | 50° | 0.1 | 0.4 |
| 1-3 (comparative) | | 45° | 0.1 | 0.5 |
| 1-4 (comparative) | | 45° | 0.1 | 0.5 |
| 1-5 (comparative) | | 40° | 0.1 | 1 |
| 1-6 (comparative) | | 30° | 0.02 | 10 |
| 1-7 (comparative) | | 15° | 0.05 | 50 |
| 2-1 | | 25° | 2 | 12 |
| 2-2 | | 25° | 1 | 10 |
| 2-3 | | 25° | 2 | 13 |
| 2-4 | | 20° | 3 | 30 |
| 2-5 | | 15° | 0.2 | 400 |
| 2-6 | | 20° | 3 | 29 |
| 2-7 | | 20° | 3 | 30 |
| 2-8 | 8 ± 0.1 | 25° | 3 | 20 |

As table 5 shows, the formulations of the invention have improved rheological properties with a lower tendency to sedimentation and clumping. This is apparent both from the greater modulus of elasticity of the formulations of the invention and the smaller phase angle.

Accordingly, the formulations of the invention have higher yield stress and higher dynamic viscosity at the yield point than the formulations known from the prior art.

Technical Characterization and Storage Stability

The dispersions do not lose their rheological properties on storage over 2W @RT/30° C./54° C. (table 2).

| | Modulus of elasticity (Pa) @ under stress (measured @ 0.1 Hz) | Phase angle (°) @ under stress (measured @ 0.1 Hz) | Yield stress | Dynamic viscosity @ yield stress (Pa*s) |
|---|---|---|---|---|
| 2-1 | 8 Pa @0.2 | 8/8 Pa @0.2 | 25° | 25°/25° | 2 | 2/1 | 12 | 12/10 |
| 2-2 | | | 25° | 30°/30° | 1 | 3/3 | 10 | 10 |
| 2-3 | | | 25° | 25°/27° | 2 | 2/2 | 13 | 10/6 |
| 2-4 | | | 20° | 20°/25° | 3 | 10/7 | 30 | 4/3 |
| 2-5 | | @0.003 | 15° | 15°/20° | 0.2 | 0.5/0.2 | 400 | 400/300 |
| 2-6 | | | 20° | 20°/20° | 4 | 4/4 | 29 | 21/21 |
| 2-7 | | | 20° | 20°/20° | 3 | 3/3.6 | 30 | 25/19 |
| 2-8 | 8 ± 0.1 | 8/6Pa @0.1 | 25° | 25°/35° | 3 | 3/2 | 20 | 20/10 |

In addition, the representative formulation example 2-S does not lose its technical properties (AI concentration, particle size, syneresis) after storage (table 7).

TABLE 7

Technical Properties & Storage Stability

| Forum Example | Particle size (d90/d50 μm) | | | AI concentration (% w/w) | | | Syneresis of sediment/ (% separation) | | |
|---|---|---|---|---|---|---|---|---|---|
| | Start | 2W RT/54 | 8W RT/54 | Start | 2W RT/54 | 8W RT/54 | Start | 2W RT/54 | 8W RT/54 |
| 2-8 | 3/1 | 2.3/0.6; 2.6/0.7 | 2.5/0.7; 2.7/0.8 | 21.6 | 21.4/21/6 | 21.4/21.6 | 0 | 0/0 | 0/0 |

Unless defined otherwise, W means weeks and D means days in the context of the present invention.

Biological Activity after Drip Application

Drip application in greenhouse test: Cotton plants are planted in flowerpots with 1 L of sandy loam soil (58.5% sand, 12.9% clay, 28.5% loam, 1.6% humus, pH 6.8). After 7 days, 1 mg of the active ingredient in the specified formulation in 60 mL of water is dripped into the soil in the pot about 1 cm from the stem of the plant using a soil spike over a period of 15 min. The plants are kept in a greenhouse at 25° C. under adequate illumination. Infection with a mixed population of *Aphis gossypii* follows after a further seven days (in which the plants are watered as required without water overtopping the pot). 7 days after the infection, mortality (dead animals compared to a fully effective standard and to the untreated control) is evaluated.

Drench application in greenhouse test: Cotton plants are planted in flowerpots with 1 L of sandy loam soil (58.5% sand, 12.9% clay, 28.5% loam, 1.6% humus, pH 6.8). After 7 days, 2 mg of the active ingredient in the specified formulation in 60 mL is poured all at once into the soil in the pot around the stem. The plants are kept in a greenhouse at 25° C. under adequate illumination. Infection with a mixed population of *Aphis gossypii* follows after a further seven days (in which the plants are watered as required without water overtopping the pot). 7 days after the infection, mortality (dead animals compared to a fully effective standard and to the untreated control) is evaluated.

TABLE 8

| Application method | Formulation example | AI concentration | pH of spray solution | Biological control |
|---|---|---|---|---|
| Drip | 2-8 | 1 mg AI/L soil | pH 7 | 55% 65% |
| Drench | 2-8 | 2 mg AI/L soil | pH 5 pH 7 | 85% 93% |

Test and Storage Methods:

All tests were conducted by CIPAC methods that are customary in crop protection (CIPAC=Collaborative International Pesticides Analytical Council; www.cipac.org). Long-term storage was conducted according to CIPAC MT 46.3 at room temperature/54° C. for a storage time of 2 weeks. The terms used hereinafter have the following meanings: Unless stated otherwise, testing is conducted in a 1% solution in water (CIPAC D, water hardness 342 ppm) at 23° C.

0T=test result after zero days of storage;

2W RT/54=test result of the accelerated storage test (2 weeks at room temperature/54° C.) to test the long-term stability of a formulation product;

D90/50=active ingredient particle size (laser scattering, 90%/50% of all volume particles);

D90/50 2WRT/54=active ingredient particle size after storage test (2 weeks at room temperature/54° C.); an increase in the values indicates crystal growth, with an increase by a factor of 2 usually still being acceptable; more than a factor of 4 is unacceptable;

Sediment=values>10% indicate significant sediment formation.

The invention claimed is:

1. A composition comprising:
a. at least one ketoenol insecticide
b. at least one dispersant,
c. at least one pH buffer,
d. xanthan as rheology modifier,
e. at least one antifreeze,
f. at least one biocide,
g. at least one defoamer, and
h. optionally further active ingredients and adjuvants, and
i. water,
wherein a) is a tetramic acid derivative of formula (I)

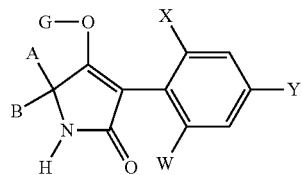

(I)

wherein,
W and Y are independently hydrogen, $C_1$-$C_4$-alkyl, chlorine, bromine, iodine or fluorine,
X is $C_1$-$C_4$-alkyl, $C_1$-$C_4$-alkoxy, chlorine, bromine or iodine,
A. B and the carbon atom to which they are bonded are $C_3$-$C_6$-cycloalkyl substituted by an optionally $C_1$-$C_4$-alkyl- or $C_1$-$C_4$-alkoxy-$C_1$-$C_2$-alkyl-substituted alkylenedioxy group that forms a 5-membered or 6-membered ketal together with the carbon atom to which it is bonded,
G is hydrogen (a) or is one of the groups

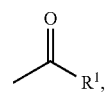

(b)

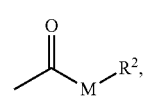

(c)

E, (d)

wherein,
E is a metal ion or an ammonium ion,
M is oxygen or sulfur,
R1 is straight-chain or branched $C_1$-$C_6$-alkyl,
R2 is straight-chain or branched $C_1$-$C_6$-alkyl,
and wherein components a through g are present as follows
a) 200-400 g/L
b) 40-90 g/L,
c) 0.9-2.0 g/L,
d) 3-5 g/L,
e) 100-150 g/L,
f) 0.05-1.5 g/L,
g) 0.05-1.5 g/L.

2. The composition according to claim 1, wherein component a) is a compound of formula (I)

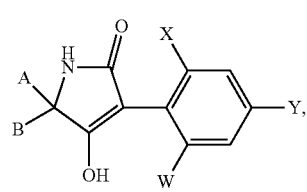

(I)

wherein
W is $CH_3$,
X is $CH_3$,
Y is $CH_3$, Cl or Br, and
A and B together form

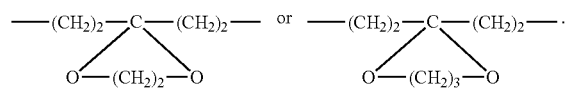

3. The composition of claim 1, wherein component a) is a compound of formula (I-2)

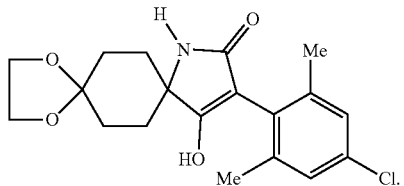
(I-2)

4. The composition of claim 1, wherein component b) is a nonionic dispersant based on one or more tristyrylphenol polyethylene glycol ethers.

5. The composition of claim 1, wherein component c) is citrate- or phosphate-based pH buffer.

6. The composition of claim 1, wherein component e) is an antifreeze selected from the group consisting of ureas, diols and polyols.

7. The composition of claim 1, wherein component f) is a biocide selected from the group of the isothiazolinones.

8. The composition of claim 1, wherein component g) is a silicone-based defoamer.

9. The composition of claim 1, comprising
a. a compound of formula (I)

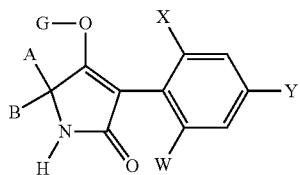

wherein the compound of formula (I) has the following definitions:
W is methyl,
X is chlorine or methyl,
Y is chlorine, bromine or methyl,
A, B and the carbon atom to which they are attached represent saturated $C_6$-cycloalkyl which is substituted by an alkylenedioxy group which, together with the carbon atom to which it is attached, forms a 5-membered or 6-membered ketal,
G is hydrogen (a) or is one of the groups

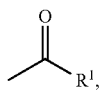
(b)

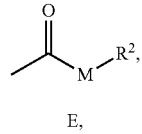
(c)

E, (d)

in which
M is oxygen,
E is metal ion or an ammonium ion,
$R^1$ is straight-chain or branched $C_1$-$C_4$-alkyl,
$R^2$ is straight-chain or branched $C_1$-$C_4$-alky-,
b. at least one nonionic dispersant selected from the group consisting of tristyrylphenol alkoxylates and fatty acid polyglycol ether esters,
c. at least one pH buffer selected from the group consisting of citrate- and phosphate-based pH buffers,
d. at least one rheology modifier selected from the group consisting of organic thickeners based on xanthan,
e. at least one antifreeze selected from the group consisting of ureas, diols and polyols,
f. at least one biocide from the group of isothiazolinones,
g. at least one defoamer from the group of the silicone- or silane-based defoamers,
h. optionally further active ingredients and adjuvants.

10. The composition of claim 1, comprising
a. a compound of formula (I-2):

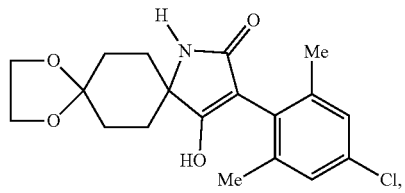
(I-2)

b. at least one nonionic dispersant selected from the group consisting of tristyrylphenol alkoxylates,
c. at least one pH buffer selected from the group consisting of citrate- and phosphate-based pH buffers,
d. xanthan as rheology modifier,
e. at least one antifreeze selected from the group consisting of ethylene glycol, propylene glycol and glycerol,
f. benzisothiazolinone as biocide,
g. at least one defoamer from the group of the silicone-based defoamers,
h. optionally further active ingredients and adjuvants.

11. A product comprising a content of a composition of claim 1.

12. The product of claim 11 for controlling insects.

* * * * *

UNITED STATES PATENT AND TRADEMARK OFFICE
CERTIFICATE OF CORRECTION

PATENT NO. : 12,213,484 B2
APPLICATION NO. : 17/046743
DATED : February 4, 2025
INVENTOR(S) : Peris et al.

It is certified that error appears in the above-identified patent and that said Letters Patent is hereby corrected as shown below:

In the Claims

In Column 23, Line 46, in Claim 1, delete "insecticide" and insert -- insecticide, --, therefor.

In Column 24, Line 6, in Claim 1, delete "A. B" and insert -- A, B --, therefor.

In Column 24, Line 34, in Claim 1, delete "g/L" and insert -- g/L, --, therefor.

In Column 24, Line 55, in Claim 2, delete "wherein" and insert -- wherein, --, therefor.

In Column 26, Line 11, in Claim 9, delete "is" and insert -- is a --, therefor.

In Column 26, Line 13, in Claim 9, delete "$C_1$-$C_4$-alky-," and insert -- $C_1$-$C_4$-alkyl, --, therefor.

Signed and Sealed this
Sixth Day of May, 2025

Coke Morgan Stewart
*Acting Director of the United States Patent and Trademark Office*